Jan. 22, 1946.　　　　E. S. PETERSON　　　2,393,408
ELECTRICALLY CONTROLLED IRIS DIAPHRAGM
Filed July 1, 1944　　　2 Sheets-Sheet 1

INVENTOR.
EDWARD S. PETERSON
BY
ATTORNEY

Jan. 22, 1946.　　　　E. S. PETERSON　　　　2,393,408
ELECTRICALLY CONTROLLED IRIS DIAPHRAGM
Filed July 1, 1944　　　　2 Sheets-Sheet 2

INVENTOR.
EDWARD S. PETERSON
BY
Chas. K. Candy
ATTORNEY

Patented Jan. 22, 1946

2,393,408

UNITED STATES PATENT OFFICE 2,393,408

ELECTRICALLY CONTROLLED IRIS DIAPHRAGM

Edward S. Peterson, Elmwood Park, Ill., assignor to Automatic Electric Laboratories, Inc., Chicago, Ill., a corporation of Delaware Application July 1, 1944, Serial No. 543,118

7 Claims. (Cl. 95—64)

The present invention pertains to electrically operated means for adjusting the aperture of iris diaphragms in cameras or the like.

One example of a practical application of the invention is its use in cameras used for aerial photography. The cameras used for this purpose may be more advantageously located in the airplane if they are arranged to be controlled from a remote point.

In the illustrated embodiment of the invention it is shown as applied to a Kodak Aero-Ektar f:2.5EA1044 lens and iris diaphragm assembly manufactured by the Eastman Kodak Co. The details of the iris diaphragm which are not affected by the invention have not been shown. It will be apparent that the invention may readily be applied to any iris diaphragm which has a rotatable diaphragm adjusting ring for regulating the size of the aperture.

The principal object of the present invention is to provide an electrically controlled means for adjusting an iris diaphragm to any one of a number of predetermined aperture sizes.

A further object of the invention is to provide a convenient means for changing the range of aperture sizes over which the electrical control means is effective.

Still another object of the invention is to provide an adjusting means for an iris diaphragm that can be controlled either electrically or manually.

A feature of the invention is the unique mechanical construction employing the principle of a mangle wheel and pinion to provide a very compact assembly.

Other objects and features of the invention will appear upon a further perusal of the specification and the accompanying drawings, in which.

Briefly described, the invention consists in attaching an endless toothed sector and cam to the adjusting ring of an iris diaphragm so that a pinion arranged to be driven in only one direction and engaging the toothed sector will impart alternating rotary motion to the diaphragm adjusting ring as in a mangle wheel and pinion. The pinion is supported by an arm that is pivoted so that it may rotate in a plane parallel to the axis of rotation of the diaphragm adjusting ring. A ratchet type of electric motor is provided to drive the pinion thru spur gears. The ratchet motor is secured to a ring that is concentric with the diaphragm adjusting ring and may be rotated manually to adjust the aperture size or to set the range over which the electrical control is effective. A plurality of cam springs are also secured to the latter ring and are arranged so that each one will be operated by a projection on the cam attached to the diaphragm adjusting ring when a predetermined angular relationship occurs between the diaphragm adjusting ring and the ring to which the cam springs are secured. Circuit arrangements are provided for closing a circuit to the ratchet motor through any one of the cam springs which will cause the motor to rotate the diaphragm adjusting ring until its circuit is opened by the cam springs through which it was energized. The number of different aperture sizes which may be obtained is limited only by the number of cam springs and corresponding control circuits that are provided. The manual adjusting ring to which the driving motor and cam springs are secured can be rotated to change the range over which the electrical control circuits are effective, thus providing a wide range of control with a minimum number of control circuits. This mode of operation is particularly applicable to aerial photography because only a limited range of control is required during each flight, the manual adjusting ring being set to the required range prior to takeoff of the airplane.

Figure 1:
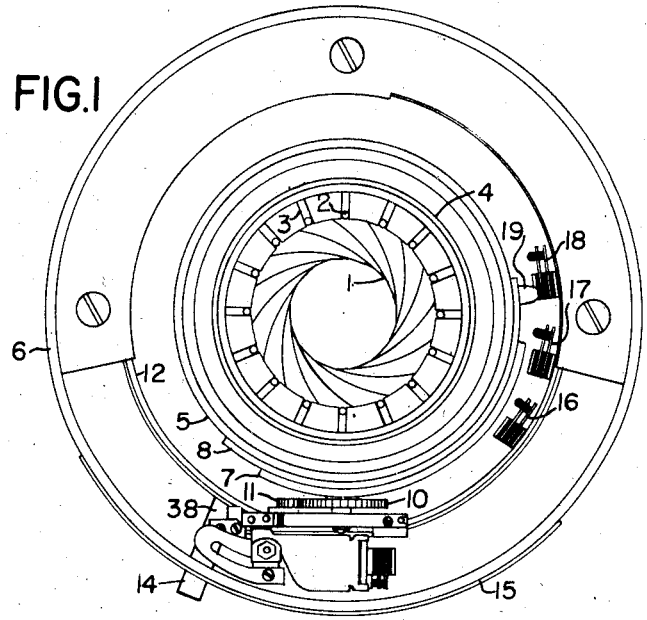
Fig. 1 is a front view of the apparatus comprising the lens mounting, iris diaphragm, and the electrical control means.
Figure 2:
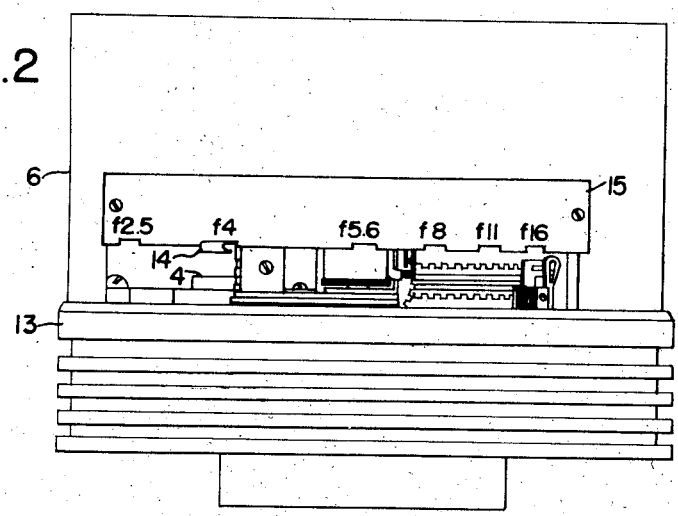
Fig. 2 is a side view of the apparatus taken from the bottom of Fig. 1.

Referring to Figs. 1 and 2, each of the overlapping leaves 1 has a pin 2 secured to it that is guided by an axially directed slot 3 in the ring 4. Each leaf is pivotally secured at a second point which is fixed in position so that rotation of the diaphragm adjusting ring 5, which is secured to ring 4, will cause each pin 2 to move in an arc eccentric with the optical axis. Since each pin 2 is constrained by the slot 3 it moves in an axial direction away from the center when adjusting ring 5 is rotated clockwise causing the leaves 1 to increase the size of the aperture formed by their inner contours.

Figure 6:
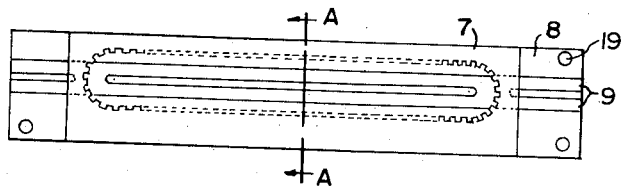
Fig. 6 is a developed view of the toothed sector through which the diaphragm adjusting ring is driven by the ratchet motor.
Figure 7:
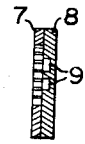
Fig. 7 is a cross-sectional view of Fig. 6 taken in the direction of the arrows at the section A—A.

As ordinarily constructed, the unit has an arm attached to the adjusting ring 5 that extends through an opening in the cylindrical hood 6, which arm is manually adjusted to regulate the aperture. In the modified version herein illustrated this arm is eliminated and instead an endless toothed sector 7 and cam 8 are bolted to the adjusting ring 5. The toothed sector 7 and cam 8 are shown in developed form in Figs. 6 and 7. In the developed form the toothed sector becomes an endless double rack. The cam 8 has two grooves 9 milled in it to receive the shaft 30 of a pinion 32 shown in Fig. 4. The toothed sector 7 and cam 8 are machined separately and then brazed together. When the pinion shaft is in the top groove the pinion engages the upper teeth of the sector 7, and when the pinion shaft is in the bottom groove the pinion engages the lower teeth of sector 7. At either end of the sector 7 the upper and lower racks are joined by a semi-circular set of teeth and at this point a section of the island between the grooves 9 in the cam 8 is removed so that the pinion will be transferred from one rack to the other when it reaches either end of the sector 7. Returning to Figs. 1 and 2 the pinion which engages the toothed sector 7 is attached to the spur gear 10 which is driven by a second pinion 11 secured to the ratchet wheel of the driving motor. The driving motor is secured to a bracket 38 which is in turn secured to a ring 12. The latter ring is concentric with the optical axis and is rotatably secured within the mounting 13 by a flange which extends slightly more than half way around the hood 6. An arm 14 attached to a part of the driving motor extends through the hood 6 and engages notches in the scale 15 which is secured to the hood 6. These notches are spaced so that stop openings indicated on the scale 15 adjacent each notch may be obtained by moving arm 14 into a corresponding slot when the pinion is at one end of its travel on the toothed sector 7. When the arm 14 is moved, the driving motor, ring 12, and diaphragm adjusting ring 5 move as a unit. Three sets of cam springs 16, 17, and 18 are secured to but insulated from the ring 12. These cam springs are normally closed but are operated to the open position when the projection 19 which is riveted to cam 8 is aligned with the insulating buffer secured to the tip of one of the cam springs of each set. The ring 4 has internal threads by means of which the lens barrel containing the front portion of the lens system is secured. This portion of the lens system has been omitted in order to disclose the control mechanism.

Figure 4:
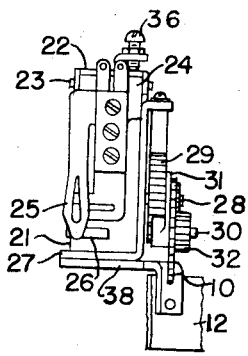
Fig. 4 is an end view of the ratchet motor as seen from the left of Fig. 3.
Figure 3:
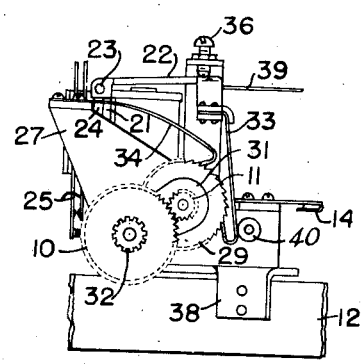
Fig. 3 is a side view of the ratchet motor used to rotate the diaphragm adjusting ring as seen from the top of Fig. 1.
Figure 5:
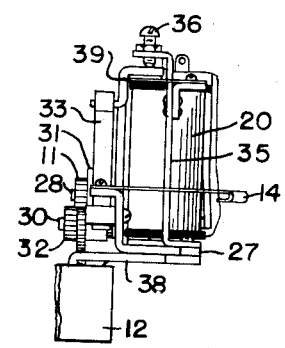
Fig. 5 is an end view of the ratchet motor as seen from the right of Fig. 3.

The driving motor will now be described with reference to Figs. 3, 4, and 5. Only a segment of the ring 12 is shown in these figures. The motor is driven by magnet 20 which is secured to an L-shaped heelpiece 21. An armature 22 having a bearing pin 23 secured to it is rotatably secured to the upper end of the heelpiece by a yoke 24 which has a slot in it to receive the bearing pin 23. A set of normally closed contact springs 25 are secured to but insulated from the yoke 24 and heelpiece 21. An insulating buffer secured to the tip of one of these springs is engaged by an arm 26 extending from the armature 22. A second bracket 27 is secured between the first bracket 38 and the heelpiece 21 by flat-head screws which are not shown that pass through the two brackets 38 and 27 into threaded holes in the heelpiece 21. A bearing stud 28 is staked to the bracket 27 to support the ratchet wheel 29 and pinion 11. The ratchet wheel 29 and pinion 11 are made in two parts which are assembled with an arm 31 rotatably secured between them so that the pinion 11 and ratchet wheel 29 rotate together and the arm 31 is free to rotate separately about the same axis. The ratchet wheel 29 and pinion 11 are retained on the bearing stud 28 by a hairpin fastener which engages a groove in the stud 28. A second bearing stud 30 is staked to the free end of the arm 31 and it supports spur gear 10 and pinion 32 so that spur gear 10 engages the pinion 11. 32 is the pinion that engages the toothed sector 7 and is guided by its bearing 30 which engages the grooves in the cam 8. The ratchet wheel 29 is driven by a flat-pawl spring 33 which is riveted at its upper end to an arm extending from the armature 22 and has a hook formed in its lower end which engages the teeth of the ratchet wheel. When the armature 22 is attracted by the magnet 3 it rotates in a clockwise direction causing the pawl spring 33 to be advanced to a succeeding tooth of the ratchet wheel. The ratchet wheel is prevented from rotating in a clockwise direction by a second flat spring 34 which is bolted to the bracket 27 at one end and has a hook formed in its other end which engages the ratchet wheel 29. When the armature 22 is released by magnet 3 it is restored by a flat V-shaped spring 39 which engages the armature 22 at one end of the V and has the other end bolted to bracket 35 which is in turn bolted to bracket 38. Restoration of the armature 22 causes the ratchet wheel 29 to be rotated counter-clockwise by the pitch of one tooth. A stop 40 is bolted to the bracket 27 and is located so that it prevents the hook in the pawl spring 33 from being disengaged from the ratchet wheel 29 in the normal position of the armature so as to prevent the ratchet wheel from advancing more than one step due to overthrow. At its upper end bracket 35 also supports a stop screw 36 which is used to adjust the stroke of armature 22. Arm 14 is bolted to bracket 27. This arm is resilient and is tensioned so that it bears against the scale 15 as shown in Fig. 2. A three position control switch 37 (Fig. 8) is provided to control the iris diaphragm. The stop openings which are obtained for the three positions of the switch depends upon which notch of scale 15 that the manual adjusting arm 14 is engaged with and also upon the location of cam springs 16 to 18 on the ring 12. In the illustrated example three stop openings between f 2.5 and f 4.5 are obtainable with the arm 14 in the f 4 notch of scale 15 and another three openings between f 4.5 and f 16 are obtainable with arm 14 in the f 11 notch of scale 15. Other stop openings will be obtained with the arm 14 in any of the intermediate notches of scale 15. Once the cam springs 16 to 18 are located so as to obtain the desired stop openings with the arm 14 in a particular one of the notches in scale 15 the stop openings which will be obtained with the arm 14 in any other notch are determined by the relationship which exists between the angular displacement of the diaphragm adjusting ring 5 and the corresponding stop opening. This relationship is governed by the contour of the diaphragm leaves 1 and the relative location of the pivot point and pin 2.

Figure 8:
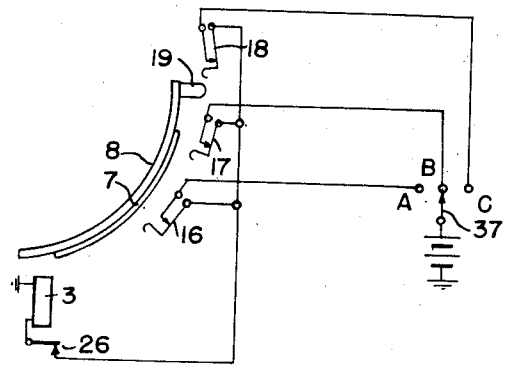
Fig. 8 is a schematic diagram of the electrical control circuit.

Referring to the schematic diagram shown in Fig. 8, the control switch 37 is shown in position B. A circuit to the magnet 3 of the driving motor is thus completed from ground, through magnet 3, contacts 26, cam springs 17, and contact B of switch 37 to battery. The magnet 3 will attract its armature to advance the pawl spring to a succeeding tooth of the ratchet wheel and will also operate contacts 26. The operation of contacts 26 will open the circuit to magnet 3 causing it to release its armature and thus advance the ratchet wheel one tooth, at the same time the circuit to the magnet is again closed at contacts 26. The magnet 3 thus operates self-interrupting to rotate the ratchet wheel. The motion of the ratchet wheel is transmitted through pinion 11 to spur gear 10 and pinion 32. The rotary motion of pinion 32 is transformed into alternating rotary motion of adjusting ring 5 by the endless toothed sector 7 as previously described. The initial direction of rotation of the adjusting ring 5 depends upon which one of the grooves 9 in the cam 8 that the bearing stud 30 is engaged with. Thus the button 19 of the cam 8 may be moved closer to or farther away from the cam springs 17. If the adjusting ring does rotate in a direction which causes the button 19 to move away from the cam springs 17 it will continue to rotate until the end of the toothed sector 7 reaches the pinion 32. At this point the pinion 32 will be shifted from one groove to the other by the semicircular set of teeth at the end of the sector causing the adjusting ring to rotate in the reverse direction. In either case when the button 19 reaches the cam springs 17 it will operate the cam springs to open the circuit to the driving motor thus stopping any further motion of the driving ring. The apparatus will remain in this last position until the control switch 37 is moved to select a different aperture at which time a circuit will be completed through a different set of cam springs to the driving motor causing it to rotate the adjusting ring 5 until its circuit is again opened by the operation of the cam springs through which it is energized. It should be noted that when the arm 14 is shifted, the motor, cam springs, and adjusting ring 5 all maintain the same relative positions thus permitting optional manual adjustment of the iris diaphragm.

The wiring of the cam springs and the driving motor is not shown in Figs. 1 and 2 for clarity. The necessary connections are effected by a cable which is brought out through the opening in the hood 6 beneath the scale 15.

Having described and illustrated the invention what is considered new and is desired to secure by Letters Patent is pointed out in the appended claims.

What is claimed is:

1. In combination with an iris diaphragm having a rotatable adjusting ring for varying the size of the aperture therein, an electric motor operated to rotate said adjusting ring between two limiting positions, means reversing the direction of rotation of said adjusting ring whenever it reaches either of said limiting positions, a cam secured to said adjusting ring, a plurality of normally closed switches positioned in operative relationship with said cam, said switches being successively opened by said cam as said adjusting ring is rotated from one to the other of said two limiting positions, and means operated to complete an energizing circuit to said motor through any one of said switches.

2. In combination with an iris diaphragm having a rotatable adjusting ring for varying the size of the aperture therein, a mangle wheel secured to said adjusting ring, a pinion engaging said mangle wheel, an electric motor operated to rotate said pinion in a continuous direction, said mangle wheel reversing the direction of rotation of said adjusting ring whenever it reaches either of two limiting positions, a cam secured to said adjusting ring, a plurality of normally closed switches positioned in operative relationship with said cam, said switches being successively opened by said cam as said adjusting ring is rotated from one to the other of said two limiting positions, and means operated to complete an energizing circuit to said motor through any one of said switches.

3. In combination with an iris diaphragm having a rotatable adjusting ring for varying the size of the aperture therein, a mangle wheel secured to said adjusting ring, a pinion engaging said mangle wheel, a ratchet motor operated to rotate said pinion in a continuous direction, said mangle wheel reversing the direction of rotation of said adjusting ring whenever it reaches either of two limiting positions, a cam secured to said adjusting ring, a plurality of normally closed switches positioned in operative relationship with said cam, said switches being successively opened by said cam as said adjusting ring is rotated from one to the other of said two limiting positions, and means operated to complete an energizing circuit to said motor through any one of said switches.

4. In combination with an iris diaphragm having a rotatable adjusting ring for varying the size of the aperture therein, a second ring rotatably secured concentric with said adjusting ring, an electric motor secured to said second ring operated to rotate said adjusting ring between two limiting angular positions relative to said second ring, a cam secured to said adjusting ring, a plurality of normally closed switches secured to said second ring positioned in operative relationship with said cam, said switches being successively opened by said cam as said adjusting ring is rotated from one to the other of said two limiting positions, means operated to complete an energizing circuit to said motor through any one of said switches, a fixed member, and a manually operable arm secured to said second ring and adjustably secured to said fixed member for altering the angular position of said second ring relative to said fixed member to thereby vary the range of aperture sizes over which said motor and switches are effective.

5. In combination with an iris diaphragm having a rotatable adjusting ring for varying the size of the aperture therein, a second ring rotatably secured concentric with said adjusting ring, an electric motor secured to said second ring operated to rotate said adjusting ring between two limiting angular positions relative to said second ring, means reversing the direction of rotation of said adjusting ring whenever it reaches either of said two limiting positions, a cam secured to said adjusting ring, a plurality of normally closed switches secured to said second ring positioned in operative relationship with said cam, said switches being successively opened by said cam as said adjusting ring is rotated from one to the other of said two limiting positions, means operated to complete an energizing circuit to said motor through any one of said switches, a fixed member, and a manually operable arm secured to said second ring and adjustably secured to said fixed member for altering the angular position of said second ring relative to said fixed member to thereby vary the range of aperture sizes over which said motor and switches are effective.

6. In combination with an iris diaphragm having a rotatable adjusting ring for varying the size of the aperture therein, a second ring rotatably secured concentric with said adjusting ring, an electric motor secured to said second ring operated to rotate said adjusting ring between two limiting angular positions relative to said second ring, a cam secured to said adjusting ring, a plurality of normally closed switches secured to said second ring positioned in operative relationship with said cam, said switches being successively opened by said cam as said adjusting ring is rotated from one to the other of said two limiting positions, means operated to complete an energizing circuit to said motor through any one of said switches, a fixed member having spaced detents therein, an arm secured to said second ring manually operable into engagement with any of said detents for altering the angular position of said second ring relative to said fixed member to thereby vary the range of aperture sizes over which said motor and switches are effective.

7. In combination with an iris diaphragm having a rotatable adjusting ring for varying the size of the aperture therein, a second ring rotatably secured concentric with said adjusting ring, a mangle wheel secured to said adjusting ring, a pinion engaging said mangle wheel, a ratchet motor secured to said second ring operated to rotate said pinion in a continuous direction, said mangle wheel reversing the direction of rotation of said adjusting ring whenever it reaches either of two limiting angular positions relative to said second ring, a cam secured to said adjusting ring, a plurality of normally closed switches secured to said second ring positioned in operative relationship with said cam, said switches being successively opened by said cam as said adjusting ring is rotated from one to the other of said two limiting positions, means operated to complete an energizing circuit to said motor through any one of said switches, a fixed member, and a manually operable arm secured to said second ring and adjustably secured to said fixed member for altering the angular position of said second ring relative to said fixed member to thereby vary the range of aperture sizes over which said motor and switches are effective.

EDWARD S. PETERSON.